(12) United States Patent
Nakamura et al.

(10) Patent No.: US 7,545,371 B2
(45) Date of Patent: Jun. 9, 2009

(54) DISPLAY DEVICE AND IMAGING METHOD

(75) Inventors: Takashi Nakamura, Saitama (JP); Masahiro Yoshida, Fukaya (JP); Miyuki Ishikawa, Kumagaya (JP)

(73) Assignee: Toshiba Matsushita Display Technology Co., Ltd., Tokyo-To (JP)

( * ) Notice: Subject to any disclaimer, the term of this patent is extended or adjusted under 35 U.S.C. 154(b) by 696 days.

(21) Appl. No.: 10/988,599

(22) Filed: Nov. 16, 2004

(65) Prior Publication Data
US 2005/0104877 A1 May 19, 2005

(30) Foreign Application Priority Data
Nov. 17, 2003 (JP) ............................. 2003-387039

(51) Int. Cl.
*G09G 5/00* (2006.01)
(52) U.S. Cl. ........................................ 345/207; 345/87
(58) Field of Classification Search ........... 345/81–100, 345/204, 690, 207
See application file for complete search history.

(56) References Cited

U.S. PATENT DOCUMENTS

| | | | | |
|---|---|---|---|---|
| 4,768,085 A | * | 8/1988 | Hashimoto | 348/237 |
| 6,243,069 B1 | * | 6/2001 | Ogawa et al. | 345/102 |
| 6,600,465 B1 | * | 7/2003 | Koyama | 345/87 |
| 6,747,638 B2 | * | 6/2004 | Yamazaki et al. | 345/207 |
| 6,876,762 B1 | * | 4/2005 | Ono | 382/154 |
| 7,151,560 B2 | * | 12/2006 | Matherson et al. | 348/187 |
| 7,184,009 B2 | * | 2/2007 | Bergquist | 345/90 |
| 7,205,988 B2 | * | 4/2007 | Nakamura et al. | 345/207 |
| 7,295,237 B2 | * | 11/2007 | Kusuda | 348/308 |

FOREIGN PATENT DOCUMENTS

| | | |
|---|---|---|
| JP | 11-298660 | 10/1999 |
| JP | 2001-292276 | 10/2001 |

* cited by examiner

Primary Examiner—Richard Hjerpe
Assistant Examiner—Tom V Sheng
(74) Attorney, Agent, or Firm—Oblon, Spivak, McClelland, Maier & Neustadt, P.C.

(57) ABSTRACT

A display device has a pixel array part having display elements provided inside of pixels formed in vicinity of cross points of signal lines and scanning lines aligned in matrix form; image capture circuits provided corresponding to the display elements, each including an optical sensor which picks up image at prescribed range of an imaging subject; and an image capture processing unit which generates ultimate image capture data based on result of having picked up images a plurality of times while changing image capture condition except for display color, with respect to each of M kinds of display colors.

17 Claims, 13 Drawing Sheets

RGB

| 2.7 | −0.9 | −0.8 |
|---|---|---|
| −1.2 | 2.6 | −0.4 |
| −0.4 | −1.3 | 2.7 |

F I G. 6

CMY

| −4.6 | 3.1 | 2.5 |
|---|---|---|
| 4.6 | −4.1 | 0.5 |
| 0.8 | 1.4 | −1.2 |

F I G. 7

WCM

| 10.2 | −9.7 | 0.5 |
|---|---|---|
| 2.2 | 4.6 | −5.8 |
| −5.4 | 2.9 | 3.5 |

F I G. 8

ORIGINAL IMAGE
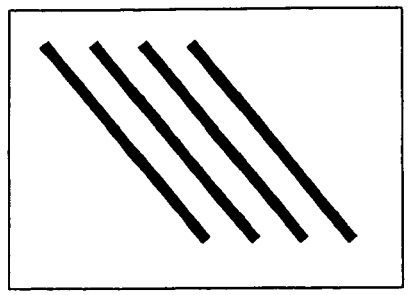
F I G. 12A
RESULT OF IMAGING LCD
DISPLAY AS BLUE RASTER
F I G. 12B
RESULT OF IMAGING LCD
DISPLAY AS GREEN RASTER
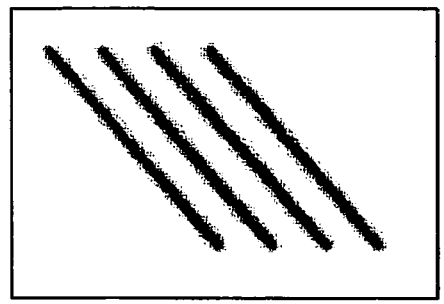
F I G. 12C
RESULT OF IMAGING LCD
DISPLAY AS RED RASTER
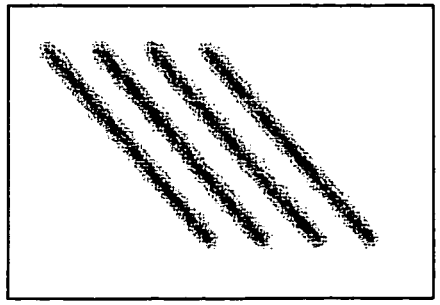
F I G. 12D
IN THE CASE OF ADDING
BLUE COMPONENT (SKELTON
COMPONENT) TO R, G AND B
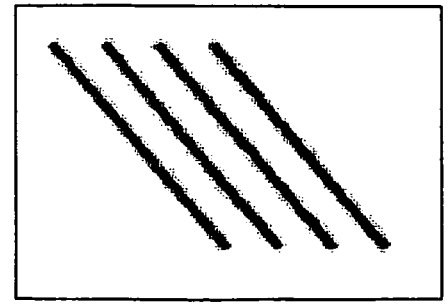
F I G. 12E

|  -1 |  -2 |  -1 |
|-----|-----|-----|
|  -2 |  28 |  -2 |
|  -1 |  -2 |  -1 | /16
F I G. 13A
|  -1 |  -1 |  -1 |
|-----|-----|-----|
|  -1 |  10 |  -1 |
|  -1 |  -1 |  -1 | /2
F I G. 13B
角川　　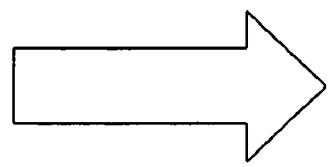　　角日
F I G. 13C

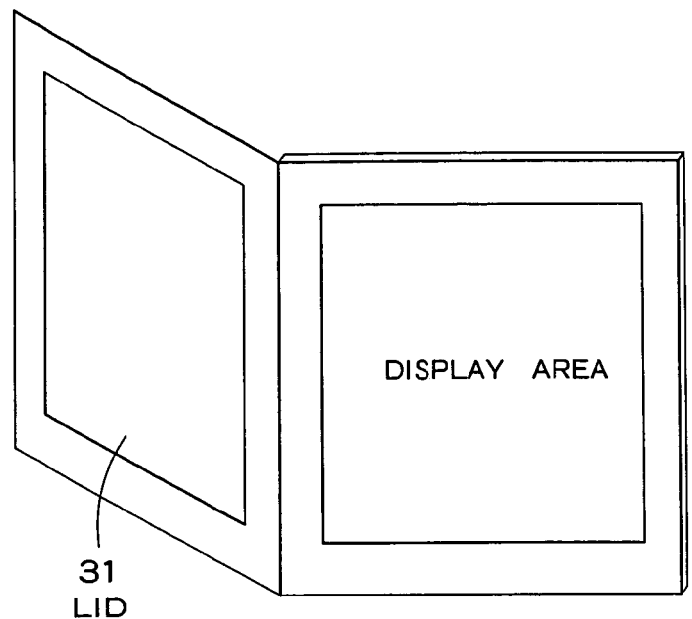
F I G. 14
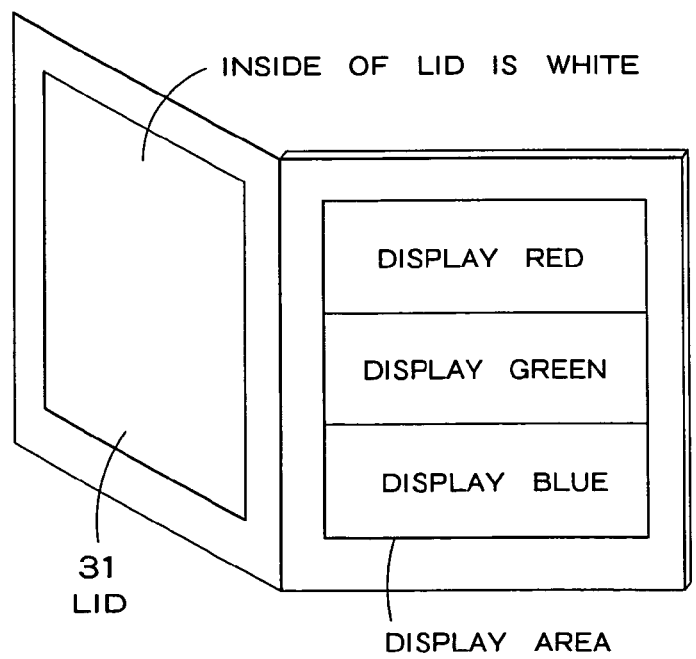
F I G. 15

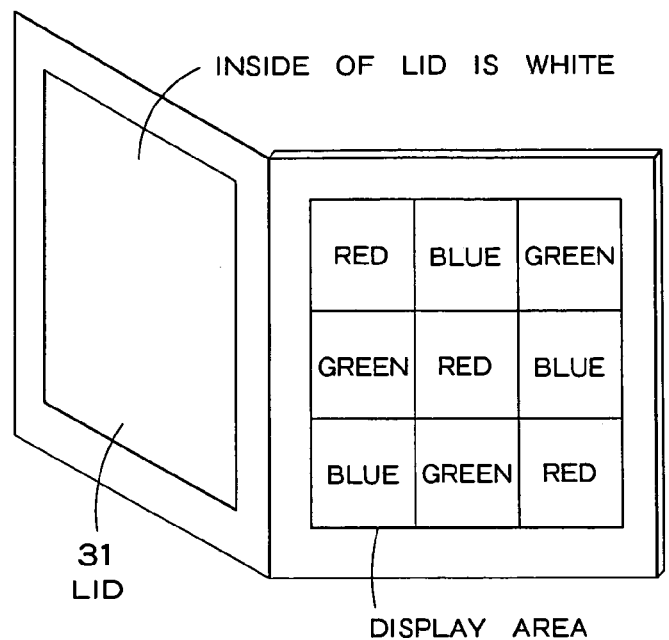
F I G. 16
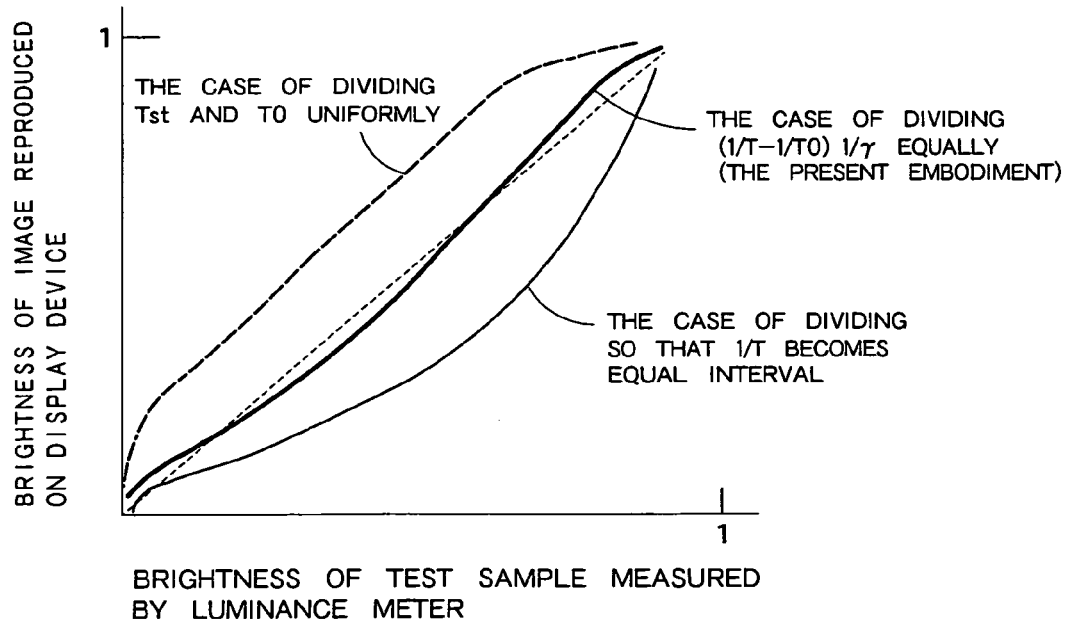
F I G. 17

DISPLAY DEVICE AND IMAGING METHOD

CROSS REFERENCE TO RELATED APPLICATIONS

This application claims benefit of priority under 35USC§119 to Japanese Patent Application No. 2003-387039, filed on Nov. 17, 2003, the entire contents of which are incorporated by reference herein.

BACKGROUND OF THE INVENTION

1. Field of the Invention

The present invention relates to a display device having an image capture function, and an imaging method.

2. Related Art

A liquid crystal display device has an array substrate on which signal lines, scanning lines, and pixel TFTs (thin film transistors) are disposed, and drive circuits that drives the signal lines and the scanning lines. Based on recent advancement and development of integrated circuit technology, a process technique of forming a part of the drive circuits on the array substrate is in practical use. With this technique, the total liquid crystal display device can be made light, thin and compact, to enable the display device to be widely used for various kinds of portable devices such as portable telephones and notebook computers.

A display device having image capture function, which has photoelectric conversion elements to capture images disposed on the array substrate, is proposed (For example, see Japanese Patent Application Nos. 2001-292276 and 2001-339640).

The conventional display device having the image capture function changes charges of capacitors connected to the photoelectric conversion elements according to the amount of light received by the photoelectric conversion elements, to detect voltages at both ends of the capacitor, thereby capturing an image.

Recently, a technique of forming pixel TFTs and drive circuits on the same glass substrate according to a polycrystalline silicon (i.e., polysilicon) process has been developed. It is possible to easily form the photoelectric conversion elements in each pixel by using the polysilicon process.

In order to detect gradations of a picked-up image in the display device having an image capture function, a method of picking up images by changing the pickup time in stages, and combining the picked-up images to finally obtain one image is available.

According to this method, however, the picked-up image finally obtained is not correctly subjected to a gamma adjustment, and therefore, has poor display quality. There is also a risk that the obtained image has much noise, depending on characteristics of the photoelectric conversion element. There is also a risk that a setting of an image capture condition is complex.

The present invention has been achieved in the light of the above problems, and has an object of providing a display device having an image capture function with excellent display quality and with little noise. It is another object of the present invention to provide an imaging method capable of picking up image based on a simple condition setting.

SUMMARY OF THE INVENTION

In order to solve the above-described problem, an object of the present invention is to provide a display device having an image capture function with an excellent display quality and with little noises.

A display device according to one embodiment of the present invention, comprising:

a pixel array part having display elements provided inside of pixels formed in vicinity of cross points of signal lines and scanning lines aligned in matrix form;

image capture circuits provided corresponding to said display elements, each including an optical sensor which picks up image at prescribed range of an imaging subject; and an image capture processing unit which generates ultimate image capture data based on result of having picked up images a plurality of times while changing image capture condition except for display color, with respect to each of M kinds of display colors.

Furthermore, a display device according to one embodiment of the present invention, comprising:

an image array part which has display elements provided inside of pixels formed in vicinity of cross points of signal lines and scanning lines aligned in matrix form;

image capture circuits provided corresponding to said display elements, each picking up image at prescribed range of an image capture subject;

an image capture condition switching unit which switches in stages a exposure time in said image capture circuit; and an irregularity processing unit which performs irregularity processing of a picked-up image, taking into consideration polarity of display data written into the pixel at image capture time.

Furthermore, a display device, comprising:

a pixel array part having display elements provided inside of pixels formed in vicinity of cross points of signal lines and scanning lines aligned in matrix form;

image capture circuits provided corresponding to said display elements, each including an optical sensor which picks up image at prescribed range of an imaging subject;

an image capture condition switching unit which switches in stages exposure time in said image capture circuits, wherein said image capture condition switch unit sets exposure time T in said image capture circuits so that $(1/T - 1/T_0)^{1/\gamma}$ changes at substantially a constant interval, where T is an exposure time of said image capture circuits, T0 is an exposure time for reading out ideal black and $\gamma$ is a gamma value of said pixel array part.

Furthermore, an image capture method of a display device according to one embodiment of the present embodiment, comprising:

a pixel array part having display elements provided inside of pixels formed in vicinity of cross points of signal lines and scanning lines aligned in matrix form; and image capture circuits provided corresponding to said display elements, each including an optical sensor which picks up image at prescribed range of an imaging subject, wherein display face of said pixel array part is arranged closely to white face of a lid, and said image capture circuit picks up images at state of setting display of said pixel array part to halftone, to acquire irregularity image for irregularity subtraction.

Furthermore, an image capture method of a display device, comprising:

a pixel array part having display elements provided inside of pixels formed in vicinity of cross points of signal lines and scanning lines aligned in matrix form; and image capture circuits provided corresponding to said display elements, each including an optical sensor which picks up image at prescribed range of an imaging subject, wherein said image capture circuit picks up images while displaying a plurality of colors for picking up color image at

BRIEF DESCRIPTION OF THE DRAWINGS

FIG. 6 is a diagram showing a concrete example of 3×3 matrix in color correction linear conversion processing.

FIG. 7 is a diagram showing another example of 3×3 matrix in color correction linear conversion processing.

FIG. 8 is a diagram showing another example of 3×3 matrix in color correction linear conversion processing.

FIG. 12 is a diagram explaining schematic skeleton processing.

FIG. 13 is a diagram showing a concrete example of 3×3 matrix used for edge emphasis procession.

FIG. 14 is a diagram showing an example having a lid provided to the display device.

FIG. 15 is a diagram showing an example in which red, green and blue are displayed at the same time at image capture time.

FIG. 16 is a diagram showing an example in which display area is divided in pieces.

FIG. 17 is a diagram showing a relationship between a brightness of the picked-up image of the subject and a brightness of the subject obtained by using a luminance meter.

DETAILED DESCRIPTION OF THE INVENTION

Figure 1:
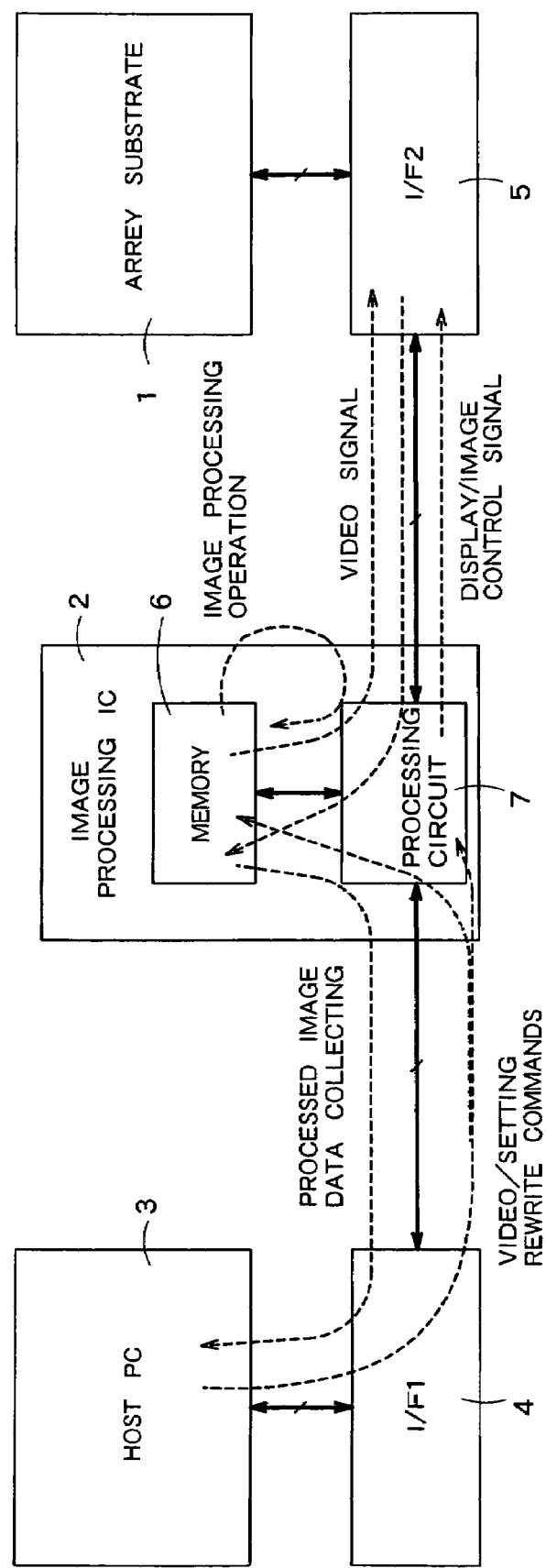
FIG. 1 is a block diagram showing schematic configuration of a display device according to one embodiment of the present invention.

Hereafter, a display device and an imaging method according to the present invention will be described more specifically with reference to the drawings. FIG. 1 is a block diagram showing a schematic configuration of a display device according to one embodiment of the present invention. The display device shown in FIG. 1 includes an array substrate 1, an image processing IC (integrated circuit) 2, a host PC (personal computer) 3, an interface (I/F1) 4 that exchanges signals between the host PC 3 and the image processing IC 2, and an interface (I/F2) 5 that exchanges signals between the array substrate 1 and the image processing IC 2.

The image processing IC 2 can be mounted on the array substrate 1, or can be mounted on another separate from the array substrate 1. The image processing IC 2 can have any package such as an ASIC (an LSI for a specific application), and an FPGA (a programmable LSI). The image processing IC 2 has a memory 6 and a processing circuit 7. For the memory 6, an SRAM (static random access memory) or a DRAM (dynamic random access memory) can be used.

The host PC send image data for display and video/setting rewrite commands to the image processing IC 2. Display data from the host PC 3 is stored in the memory 6, and a video/setting rewrite command is stored in the processing circuit 7. The video data stored in the memory 6 is sent to the array substrate 1 via the interface 5. The processing circuit 7 sends a display/imaging control signal to the array substrate 1 via the interface 5. The image data obtained on the array substrate 1 is sent to the memory 6 via the interface 5. The processing circuit 7 executes image processing such as multiple gradation or rearranging of the video data and image data stored in the memory 6.

The multiple gradation refers to addition of plural (binary) image data obtained by picking up images under plural image capture conditions, and averaging the added result by the number of conditions. The rearranging refers to rearranging the order of image data output from the array substrate 1 (which is determined based on the configuration of the circuit that outputs data from the array substrate 1) to the order following the sensor disposition. The processed image data (hereinafter, gradation data) is sent from the memory 6 to the host PC 3 via the interface 4.

The image data contains noise, and therefore, requires image processing. The processing circuit 7 carries out a part of the image processing, and the host PC 3 carries out the rest of the image processing by software. The display device sends a large amount of image data to the image processing IC 2. The image processing IC 2 sends only the image-processed data to the host PC 3. The amount of the gradation data is smaller than the amount of all image data.

As is clear from FIG. 1, the control signals, the video signals, and the image data are exchanged between the image processing IC 2 and the array substrate 1 without passing through a CPU bus. Therefore, these data do not depend on a level of congestion of the CPU bus. Even when the CPU bus is busy for other processing, the imaging operation can be carried out in parallel.

Only the collection of image-processed data and the sending of the video/setting rewrite command are carried out via the CPU bus, concerning the imaging operation. Therefore, the CPU bus does not require a high-speed transmission. Each time when one image is picked up, the image processing including the multiple gradation and the rearranging is carried out inside the IC 2. Therefore, the image processing time can be reduced substantially as compared with the time required to process all the multiple gradation and the rearranging at the host PC side. Because the transmission speed of the CPU bus can be slow, the cost of the total system can be reduced.

Figure 2:
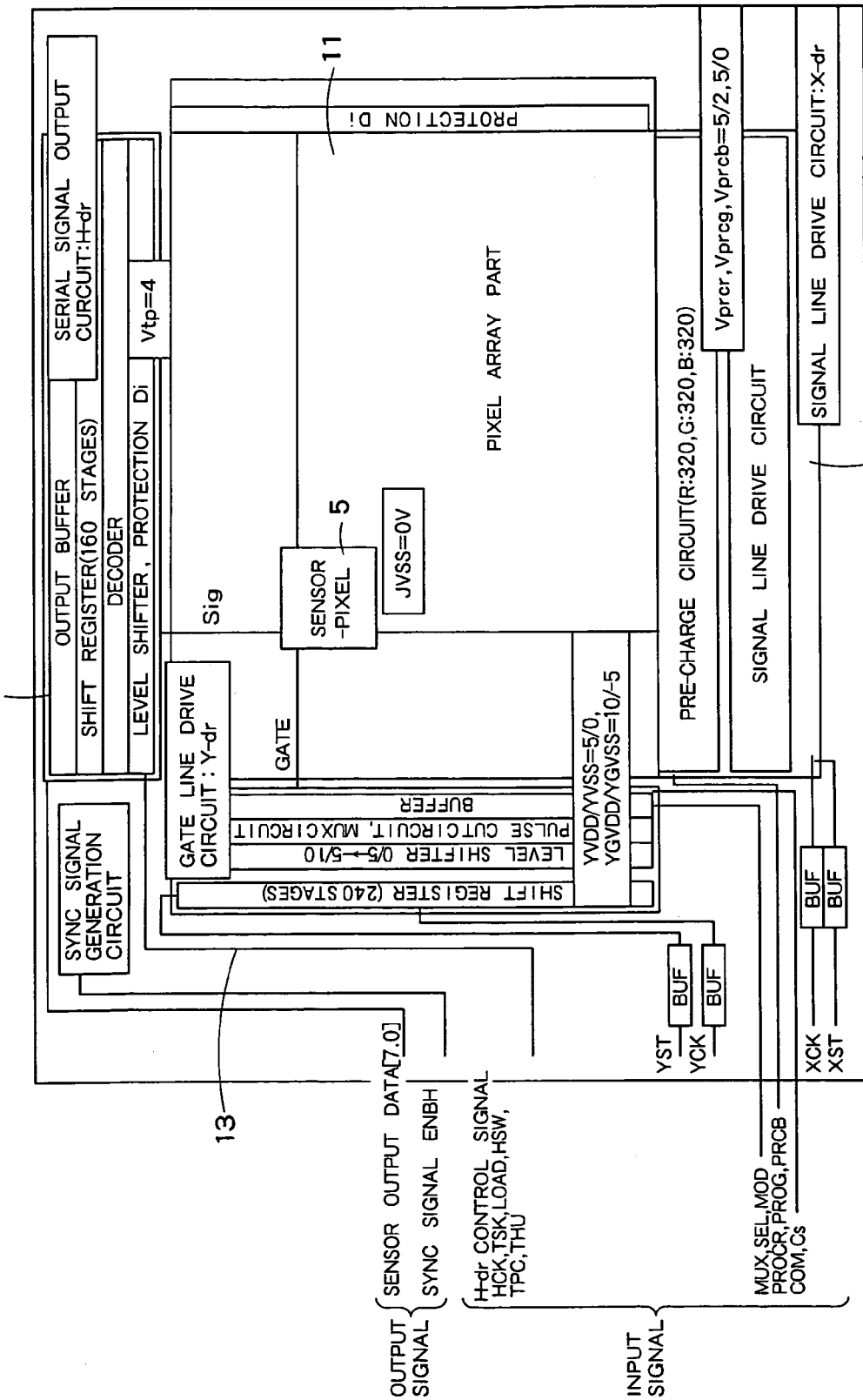
FIG. 2 is a block diagram showing one example of internal configuration of an array substrate.

FIG. 2 is a block diagram showing one example of an internal configuration of the array substrate 1, illustrating the configuration on the array substrate 1. The display device shown in FIG. 1 includes a pixel array 11 having an image capture function, on which signal lines and scanning lines are disposed, a signal line drive circuit 12 that drives the signal lines, a gate line drive circuit 13 that drives the scanning lines, and a serial signal output circuit 14 that serially outputs an image captured result. These circuits are prepared using polysilicon TFTs, and are formed on the glass array substrate 1.

Figure 3:
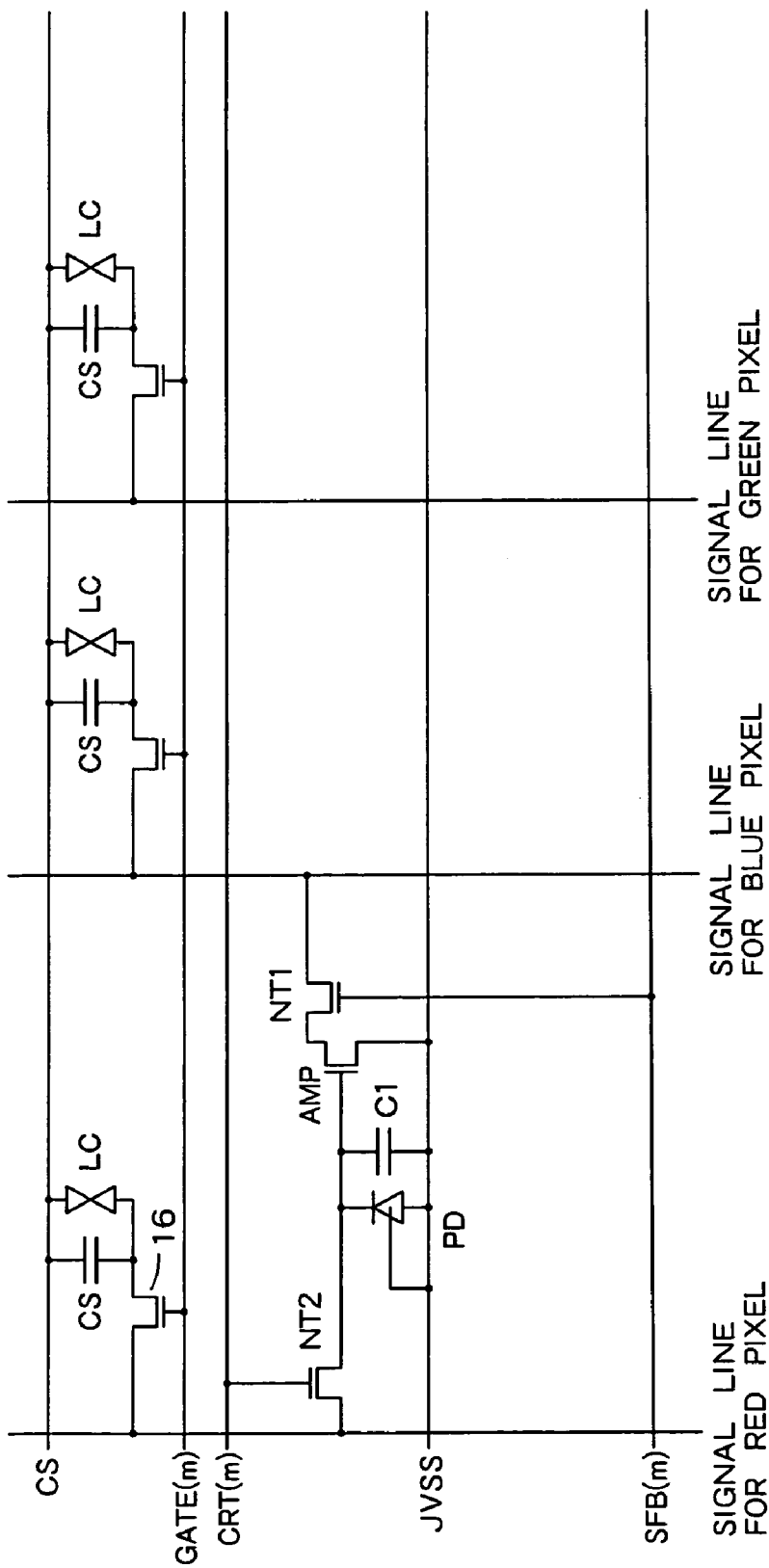
FIG. 3 is a circuit diagram showing one example of internal configuration of a pixel circuit.

The pixel array 11 has plural pixel circuits 15 disposed vertically and horizontally. FIG. 3 is a circuit diagram showing one example of an internal configuration of the pixel circuit 15. This circuit is provided for each pixel. The pixel circuit 15 shown in FIG. 3 includes a pixel TFT 16 that is driven by a gate line and has one end connected to a signal line, an auxiliary capacity Cs and a liquid crystal capacity LC that are connected to the other end of the pixel TFT 16, a photodiode PD that captures an image, a sensor capacity C1 that accumulates a charge corresponding to the image captured by the photodiode PD, an amplifier AMP that is connected to one end of the sensor capacity C1, a transistor NT1 that is driven by a control line SFB and switches a supply of an output from the AMP to the signal line, and a pre-charge transistor NT2 that is driven by a control line CRT. The photodiode PD, the sensor capacity C1, the amplifier AMP, and the transistors NT1 and NT2 are hereinafter collectively called an image capture sensor 7.

The photodiode PD can be formed using a polysilicon TFT, or can be a diode formed by injecting an impurity into polysilicon.

Figure 4:
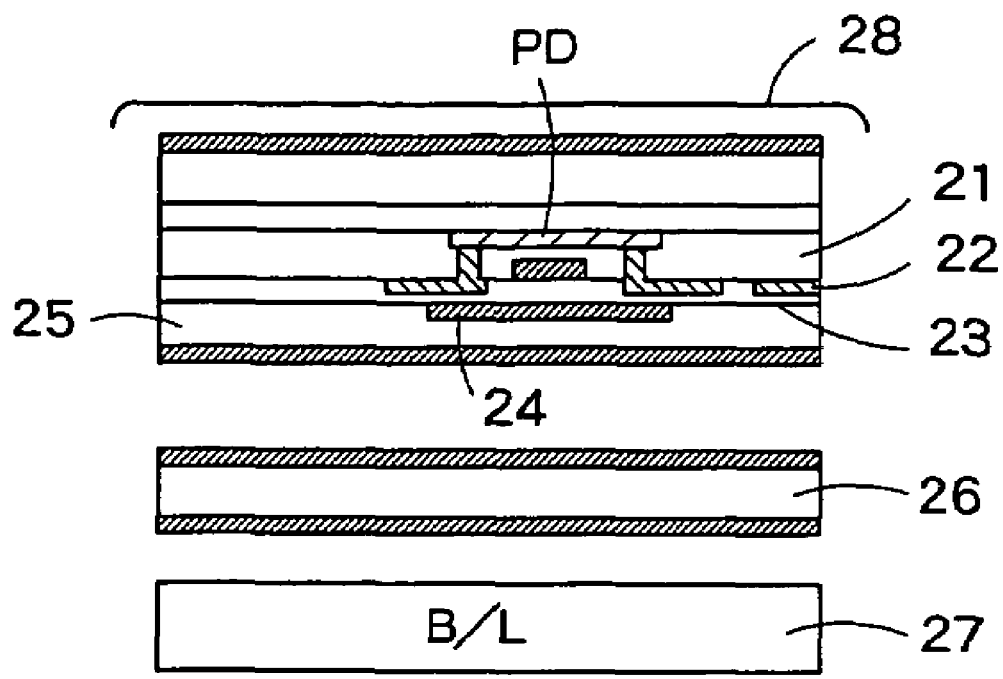
FIG. 4 is a cross sectional view showing cross sectional structure of the display device.

FIG. 4 is a cross-sectional diagram showing a cross-sectional configuration of the display device. As shown in FIG. 4, the array substrate 1 includes the photodiode PD that is formed on the glass substrate, a gate insulation film 21 that is formed on the photodiode PD, an aluminum wiring layer 22 of the photodiode PD that extends onto the gate insulation film 21, a passivation film 23 that is formed on the aluminum wiring layer 22, a light shielding layer 24 that is formed on the passivation film 23, and a transparent resin 25 that is formed on the light shielding layer 24 and the passivation film 23. As shown in FIG. 4, the array substrate 1 is disposed such that the glass substrate faces upward, and is disposed opposite to a opposite substrate 26. A backlight 27 is disposed at the opposite side of the array substrate 1 to sandwich the opposite substrate 26.

The display device according to the present embodiment can also carry out a normal display, and an image capturing like a scanner. To carry out a normal display, a transistor Q3 is set to the off state. No valid data is stored in the buffer 13. A pixel voltage is supplied to the signal line from the signal line drive circuit 12, to carry out a display corresponding to this pixel voltage.

Light from the backlight 27 is irradiated onto a subject 28 to be imaged through the array substrate 1 and the opposite substrate 26. The photodiode PD on the array substrate 1 receives light reflected from the subject 28, thereby capturing the image of the subject.

The sensor capacity C1 stores the picked-up image data as shown in FIG. 3, and then sends the image data to the image processing IC 2 shown in FIG. 1 via the signal line. The image processing IC 2 receives a digital signal that is output from the display device according to the embodiment, and performs operations such as rearranging data and removing noise contained in the data.

When the light shielding layer 24 is provided in the array substrate 1 as shown in FIG. 4, a direct light from the backlight 27 is not incident to the photodiode PD. Therefore, an optical leak current due to the light is not incident to the photodiode PD. As a result, an S/N (signal-to-noise) ratio improves.

The processing circuit 7 shown in FIG. 1 selectively executes one of at least two kinds of processing. Specifically, there are a name card image processing to read text data or a line drawing from a name card, and a natural picture imaging processing to read a shaded image.

Figure 5:
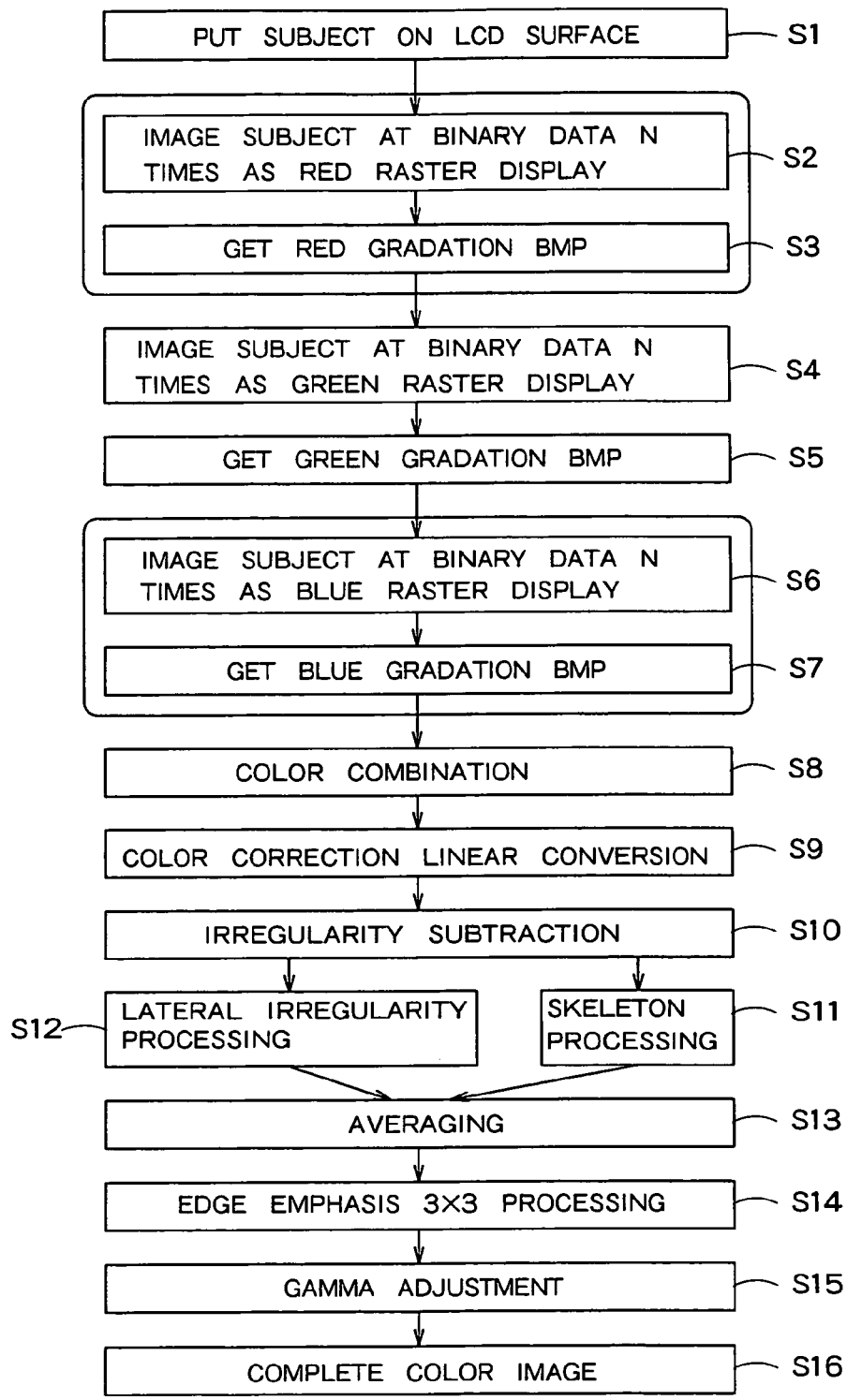
FIG. 5 is a flowchart showing one example of processing procedure of name card imaging processing.

FIG. 5 is a flowchart showing one example of a processing procedure of the name card imaging processing. First, the subject to be imaged is brought into contact with the surface of the array substrate 1 (step S1). Next, in a state that the whole array substrate 1 is displayed in red, the image capture sensor 7 images the subject N times while changing an image capture condition in stages (step S2).

An output from the image capture sensor 7 is binary data. Gradation data of red is generated based on the result of imaging by N times (step S3).

Similarly, in a state that the whole array substrate 1 is displayed in green, the image capture sensor 7 images the subject N times while changing an image capture condition in stages (step S4). Gradation data of green is generated based on the result of imaging by N times (step S5).

Similarly, in a state that the whole array substrate 1 is displayed in blue, the image capture sensor 7 images the subject N times while changing an image capture condition in stages (step S6). Gradation data of blue is generated based on the result of imaging by N times (step S7).

By picking up images in the color order of red, green, and blue, an imaged result with a least influence of noise is obtained. Because red receives most influence of a temperature change, it is preferable to obtain the red image first.

The diode or the polysilicon TFT formed by injecting an impurity into polysilicon has good S/N ratios of the optical leak current in the order of blue, green, and red. The S/N ratio of red is worst. During the imaging, heat is transferred from paper to the sensor. For example, the array substrate or the opposite substrate including the sensor has a temperature of about 32° C. due to the backlight. Paper does not necessarily have the same temperature as that of the array substrate depending on the state, and has a low temperature of 25° C., for example. It takes a few seconds to several dozens of seconds to carry out the imaging. During the imaging, the sensor is cooled with the paper. Temperatures are not uniform on the surface, and there occurs a large variation in thermocurrent within the chip.

For the above reasons, the picked-up image in the red luster color has a large variation and large noise. When the optical sensor is formed using a different material, it is preferable to check the S/N ratio of each color of the optical leak current, and pick up the image of the color of the worst S/N ratio first.

Next, the gradation data of the red, green, and blue colors obtained at steps S3, S5, and S7 are simply combined together (step S8). In this state, an image having irregular colors is obtained.

A color correction linear conversion is carried out to correct the gradation data of the red, green, and blue colors (step S9). Specifically, a color correction is carried using a 3×3 matrix as shown in the following expression (1).

$$|G'|=|M21,M22,M23| \cdot |G| \tag{1}$$

Each coefficient of this matrix is obtained in advance such that a difference between a reproduced color and the original color of a color chart is as small as possible. Each coefficient has constraints as shown in the following expressions (2) to (4). Therefore, it is possible to improve color reproduction by changing white balance.

$$M11+M12+M13=1 \tag{2}$$

$$M21+M22+M23=1 \tag{3}$$

$$M31+M32+M33=1 \tag{4}$$

FIG. 6 is a diagram showing a detailed example of 3×3 matrix. In the matrix shown in FIG. 6, a diagonal element is expressed in a positive value, and an off-diagonal element is expressed in a negative value other than zero. When the whole pixels of the liquid crystal display device are expressed in red, other color components (i.e., a green component and a blue component) leak to an oblique direction of the pixels, because of a narrow field of vision. As a result, the green component and the blue component are mixed into the picked-up image.

Therefore, to avoid the influence of other color components, the off-diagonal element of the matrix shown in FIG. 6 has a negative value.

In the flowchart shown in FIG. 5, it is explained that the array substrate 1 is sequentially set to red, green, and blue, and images are picked up N times for each color. Alternatively, the array substrate 1 can be sequentially set to cyan, magenta, and yellow, and images are picked up N times for each color. In this case, the 3×3 matrix becomes as shown in FIG. 7. In the matrix shown in FIG. 7, a diagonal element is expressed in a negative value, and an off-diagonal element is expressed in a positive value. When the array substrate 1 is sequentially set to white, cyan, and magenta, and images are picked up N times for each color, the 3×3 matrix becomes as shown in FIG. 8. In the matrix shown in FIG. 8, a diagonal element is expressed in a positive value, and an off-diagonal element is expressed in a negative value, like the matrix shown in FIG. 6.

After the color correction linear conversion is carried out at step S9 shown in FIG. 5, an irregularity subtraction is carried out (step S10). In this irregularity subtraction, an image of a uniform intermediate gradation is picked up in advance, and this gradation data is held. Because this gradation data also includes an irregular component, a difference between the gradation data and the imaged result of the subject is subtracted, thereby offsetting the irregular component.

The display device can have a lid 31 as shown in FIG. 14. Images are picked up N times for each color in a state that the internal white surface of the lid 31 is closely contacted to the display surface and that the crystal liquid display is in halftone, and the picked-up images are stored in the IC 2. With this arrangement, an irregular image to be used for the subtraction can be obtained easily. When the characteristics of the optical sensor change due to the environment such as temperature, the irregular image stored at the shipping time becomes unsuitable in some cases. In this case, when the lid is arranged as shown in FIG. 14, the irregular image can be easily obtained again immediately before the imaging. As a result, a high-quality image can be obtained.

Next, a lateral irregularity processing is carried out to remove lateral lines on the screen (step S11). At the same time, a skeleton processing is carried out (step S12).

Figures 9, 10:
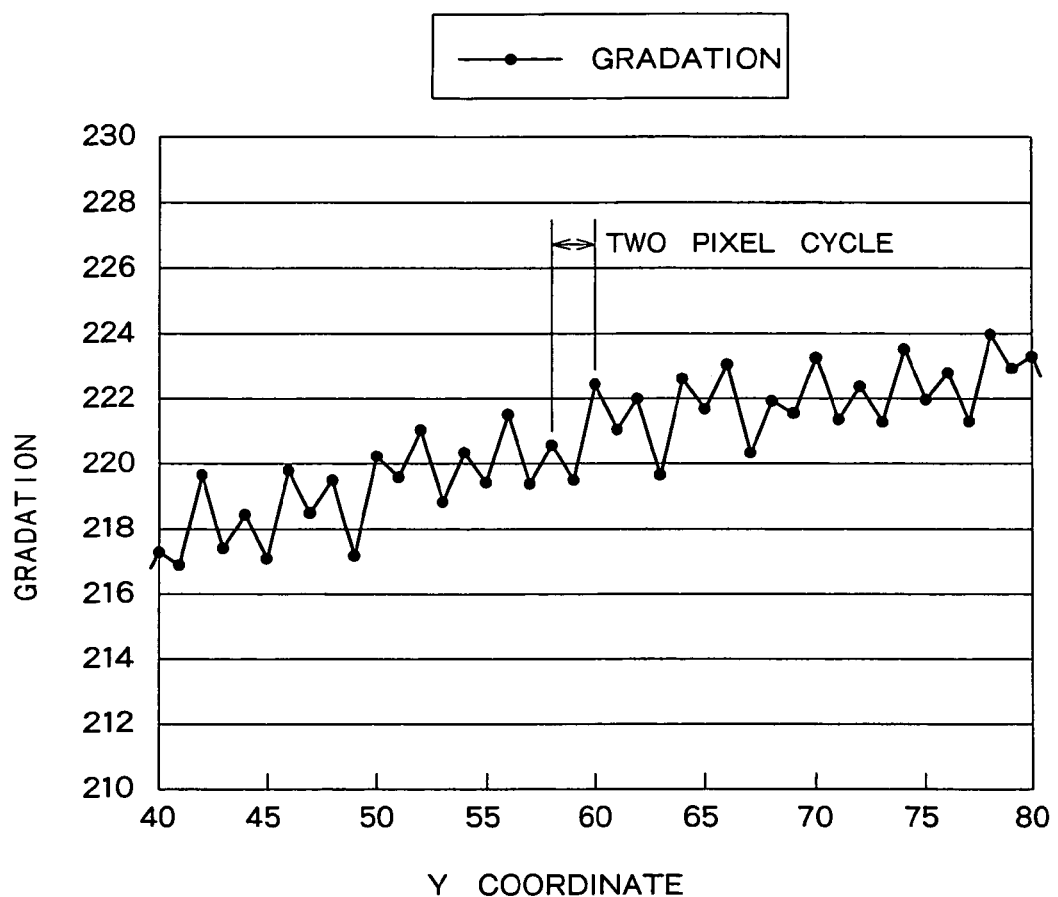
FIG. 9 is a diagram showing a relationship between pixel coordinate (Y coordinate) in a vertical direction of the screen and gradation values at coordinate positions.
FIG. 10 is a diagram showing a concrete example of 3×3 matrix used for lateral irregularity.

The outline of the lateral irregularity processing is explained. FIG. 9 is a diagram showing a relationship between pixel coordinates (Y coordinates) in a vertical direction of the screen and gradation values at coordinate positions. As shown in FIG. 9, it is clear that the gradations tend to change in a two-pixel cycle in a vertical direction. This change occurs or does not occur depending on a method of driving a liquid crystal. This change easily occurs when a pixel voltage is written into each pixel while inverting the polarity for each row. The lateral irregularity processing is a technique which is used well by the ordinary liquid crystal display and prevents liquid crystal material from proceeding deterioration when DC component continues to be applied to the liquid crystal material. Besides this, a technique of changing polarities for each line and a technique of changing polarities for each line and row are used. These techniques are used by combining with polarity inversion for each flame.

When carrying out a lateral irregularity processing, a proximity filter consisting of a 3×3 matrix as shown in FIG. 10 is used, in order to remove two-pixel irregularities shown in FIG. 9. This filter is a low-pass filter that smoothes the gradations in only a vertical direction, and takes values other than zero in only the intermediate row components of the matrix. When the gradation data of a pixel (x,y) before carrying out the lateral irregularity processing (i.e., after the irregularity subtraction) is expressed as F(x,y), and when the gradation data of the pixel (x,y) after the lateral irregularity processing is expressed as G(x,y), the following expression (5) is obtained.

$$G(x,y)=[F(x,y-1)+2F(x,y)+F(x,y+1)]/4 \quad (5)$$

Figure 11:
FIG. 11 is a diagram showing image after lateral irregularity.
Figure 11:
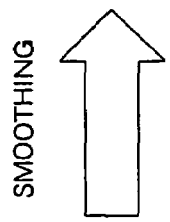
Figure 11:

When this lateral irregularity processing is carried out, a picked-up image having no lateral lines is obtained as shown in FIG. 11.

As another method, when a pixel voltage is written into each pixel under the same image capture condition, two pieces of picked-up images are acquired, and data of line with the same polarity among these two images is pulled out and combined, to generate one piece of image.

More specifically, polarities of the first picked-up image change in order of +/−/+/−/ . . . for each line when the pixel voltage is written into each pixel under the same image capture condition. Polarities of the second picked-up image change in order of −/+/−/+/ . . . for each line when the pixel voltage is written into each pixel under the same image capture condition. The image captured data of odd lines is selected from the first picked-up image, and the image captured data of even lines is selected from the second picked-up image. By combining these data, it is possible to obtain one piece of picked-up image without lateral irregularity.

Even when polarity inversion occurs for each row, or for each line and row, by extracting and combining component of the same polarity from two picked-up images, it is possible to eliminate vertical irregularity and checked irregularity.

FIG. 12 is a diagram for explaining the outline of the skeleton processing. When a subject including only lines is captured in a state that the whole array substrate 1 is displayed in blue, green, or red, imaged results are obtained as shown in FIG. 12A, FIG. 12B, and FIG. 12C. The outline of the image is clear cut when the subject is imaged in the blue state, as shown in the diagram. This is step S10 of the skeleton processing.

The image obtained in the blue display has the least blur because the image capture sensor 7 using the diode or the polysilicon TFT formed by injecting an impurity into polysilicon has the highest sensitivity to the blue color among three colors of blue, green, and red.

When the above lateral irregularity processing is carried out to an image obtained by combining the picked-up images shown in FIG. 12A, FIG. 12B, and FIG. 12C together, an image as shown in FIG. 12D is obtained. The image shown in FIG. 12D is more indistinct than that of blue due to the influence of green and red images. When the image shown in FIG. 12D is further combined with the image of blue shown in FIG. 12A, a sharply defined image is obtained as shown in FIG. 12E.

When simple-combined image data obtained by simply combining the outputs from the image capture sensor 7 are expressed as (R1, G1, B1), when image data before the lateral irregularity processing are expressed as (R2, G2, B2), and when a coefficient is expressed as U, then gradation data (R3, G3, B3) after the averaging are expressed as shown in the following expressions (6) to (8).

$$R3=(R1+U \times B2)/(1+U) \quad (6)$$

$$G3=(G1+U \times B2)/(1+U) \quad (7)$$

$$B3=(B1+U \times B2)/(1+U) \quad (8)$$

In the expressions (6) to (8), the coefficient U denotes a ratio of blue mixed into the original image, which is a real number other than a negative value. U is equal to 0.5 to 1 when high resolution (i.e., sharp outline) is required for a name card or the like. U is equal to 0 to 0.5 when a reproduction of white is important for a natural image or the like. In other words, a skeleton processing is not carried out strong for a natural image. When the optical sensor is formed using a different material, color dependency of the S/N ratio is checked, and an image obtained by using a color of the best S/N ratio is used for the skeleton processing.

After ending the lateral irregularity processing at step S11 and the skeleton processing at step S12 shown in FIG. 5, the gradations are averaged (step S13), and the edge is emphasized (step S14). At this edge emphasize processing, gradation values of the surrounding adjacent pixels are subtracted at a predetermined rate from a gradation value Lij of a focused pixel. When a gradation value after the edge emphasizing is expressed as L'ij, the following expression (9) is calculated.

$$L'_{ij} = \sum_{i,j} a_{ij} \cdot L_{ij} \quad (9)$$

A coefficient aij is expressed in a 3×3 matrix as shown in FIG. 13A and FIG. 13B. In the matrixes shown in FIG. 13A and FIG. 13B, a difference between a positive value and a negative value is 1. With this arrangement, apparent gradations make no change, even when the edge emphasize processing is carried out. FIG. 13C shows a result of carrying out the edge emphasizing.

After the edge emphasizing at step S14 shown in FIG. 5, a gamma adjustment is carried out (step S15). In the gamma adjustment, gradation values of red, green, and blue are adjusted using a gamma coefficient γ corresponding to the characteristic of the array substrate 1. The gamma coefficient γ is a positive real number, and γ is equal to about 1.2.

Specifically, when gradation values before the gamma adjustment are ($R_0$, $G_0$, and $B_0$), and also when gradation values after the gamma adjustment are expressed as (R, G, B), the following expression (10) is calculated.

$$R = R_0^\gamma, G = G_0^\gamma, B = B_0^\gamma \quad (10)$$

From the above processing, a color image of a line image of a name card or the like is obtained. For a monochromatic image of a subject, a similar processing is carried out.

At steps S2 to S7 shown in FIG. 5, in the state that the array substrate 1 is set to red, green, and blue, images are picked up N times for each color while changing the image capture condition. The image capture condition refers to an exposure time. The exposure time is switched in stages for each of the N times. A method of setting the exposure time is explained by taking the gamma coefficient into consideration.

In general, a reproduction brightness Y of the display device and the gradation value are often set to satisfy a relationship of the expression (11).

$$Y = (\text{gradation value})^\gamma \quad (11)$$

The expression (11) is modified to obtain the expression (12).

$$\text{Gradation value} = Y^{1/\gamma} \quad (12)$$

An exposure time T of the image capture sensor 7 necessary to read an image of an n-th gradation satisfies a relationship of the expression (13).

$$T \propto 1/(\text{leak current in the n-th gradation gray scale}) = 1/(\text{thermocurrent+photocurrent in the n-th gradation gray scale}) \quad (13)$$

From the expression (13), the following expression (14) is obtained.

$$1/T = a\ \text{constant} \times (\text{thermocurrent+photocurrent in the n-th gradation gray scale}) \quad (14)$$

An exposure time $T_0$ to read ideal black (i.e., a status in which a photocurrent does not occur) is expressed by the following expression (15).

$$1/T_0 = \text{constant} \times \text{thermocurrent} \quad (15)$$

When the expression (15) is subtracted from the expression (14), the following expression (16) is obtained.

$$1/T - 1/T_0 = \text{constant} \times (\text{photocurrent in the n-th gradation gray scale}) \propto \text{brightness in the n-th gradation} \quad (16)$$

From the expression (16) and the expression (12), a relationship of the following expression (17) is obtained.

$$(1/T - 1/T_0)^{1/\gamma} \propto Y^{1/\gamma} = \text{gradation of the imaged subject} \quad (17)$$

Therefore, in order to image the subject while changing the gradation of the subject at a constant interval, it is preferable to switch in stages the exposure time T such that $(1/T-1/T_0)^{1/\gamma}$ changes at substantially a constant interval. When this exposure time T is calculated in advance and is stored in the memory 6 shown in FIG. 1 or the like, the exposure time T can be selected promptly, which is desirable.

The "substantially a constant interval" refers to a range which does not exceed the neighboring Ti when the exposure times Ti (T1, T2, . . . ) are divided by the above division method.

Specifically, $T_0$ is obtained as follows. White paper (i.e., photographic printing paper or quality paper for a photograph) is closely contacted to a display surface of the display device, and the backlight of the display device is turned off. In this state, imaging is carried out while changing the imaging time. Time when the ratio of white to black of the image data output from the image capture sensor 7 becomes 1:1 is set to $T_0$.

A largest T is adjusted taking into consideration how bright white user wants as the largest gradation. When the largest T is set to be a large value, if a print having low reflectivity is read out, such as a newspaper, it is possible to reproduce background color of the newspaper as white having high reflectivity.

A smallest T is obtained as follows. A white color surface of white paper (i.e., photographic printing paper or quality paper for a photograph, or the inner white color side of the lid 31 shown in FIG. 14) is closely contacted to a display surface of the display device, and the backlight of the display device is turned on. In this state, imaging is carried out while changing the imaging time. Smallest time when the ratio of white to black of the image data output from the image capture sensor 7 becomes 1:1 is called a smallest T (hereinafter referred to as $T_{st}$). To read colors, the liquid crystal display is set to red, green, and blue, and then $T_{st\_R}$, $T_{st\_G}$, and $T_{st\_B}$ are obtained. The operation to obtain these colors may be carried out three times for each color. Alternatively, the reading can be carried out in one time operation by setting the display to red, green, and blue as shown in FIG. 15.

FIG. 16 shows a further improved method. Even when the image capture sensor 7 has a large in-plane variation of characteristics, a highly uniform image can be obtained, by obtaining Tst as shown in FIG. 16. FIG. 16 shows only one example, and various modifications are possible such as a further fining of sections of the display area. Because the image capture sensor 7 is incorporated in the display pixels, this characteristic derivation of Tst becomes possible by using this display.

FIG. 17 is a diagram showing a relationship between a brightness of the picked-up image of the subject and a brightness of the subject obtained by using a luminance meter, for each of three cases: when the exposure time T is switched in stages such that $(1/T-1/T_0)^{1/\gamma}$ changes at a constant interval; when the exposure time T is changed at a constant interval; and when the inverse number of the exposure time T is changed at a constant interval. As shown in FIG. 17, when the exposure time T is switched in stages such that $(1/T-1/T_0)^{1/\gamma}$ changes at a constant interval, the brightness of the picked-up image of the subject changes linearly. When a color image is to be obtained, it is necessary to arrange such that the white balance is not broken in the whole gradations. In this respect, changing the exposure time T in stages such that $(1/T-1/T_0)^{1/\gamma}$ changes at a constant interval is most suitable.

Figure 18:
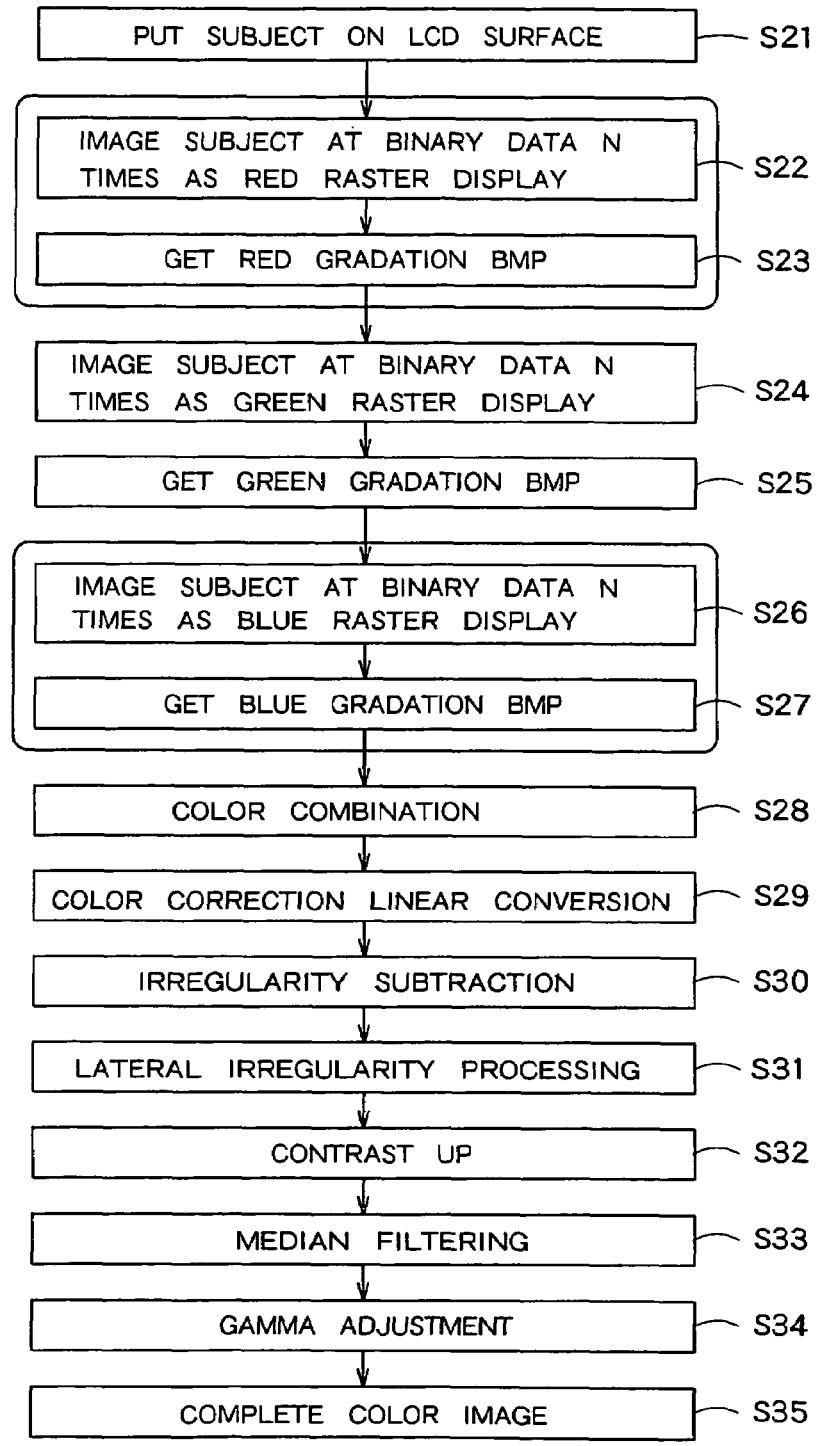
FIG. 18 is a flowchart showing one example of processing procedure of natural picture image.

A processing procedure when the subject is a natural image is explained next. FIG. 18 is a flowchart showing one example of the processing procedure of a natural image. Processing at steps S21 to S30 is the same as that at steps S1 to S10 in FIG. 5. After the subtraction at step S30 is carried out, a lateral irregularity processing similar to that at step S11 is carried out (step S31). A skeleton processing is not carried out.

A contrast-up processing is carried out next (step S32). In the contrast-up processing, gradation data after the lateral irregularity processing is converted into gradation data using from a minimum gradation value of the gradation data to a maximum gradation value thereof.

A median filtering is carried out next (step S33). The median filtering is a kind of the edge emphasizing processing at step S14 shown in FIG. 5. The outline is clear cut, and noise is removed to smooth the image in this processing. More specifically, gradation values of the 3×3 matrix surrounding the focused image are arranged in the order of large values, and the median is set as a pixel value of the focused pixel.

After ending the median filtering, a gamma processing similar to that at step S15 shown in FIG. 5 is carried out (step S34), and a final color image of a natural image is obtained (step S35).

As explained above, according to the present embodiment, in the state that the whole array substrate 1 is displayed in red, the subject is imaged N times while changing the image capture condition in stages. Next, in the state that the whole array substrate 1 is displayed in green, the subject is imaged N times while changing the image capture condition in stages. Next, in the state that the whole array substrate 1 is displayed in blue, the subject is imaged N times while changing the image capture condition in stages. Accordingly, the image having no influence of noise can be picked up.

In the color correction linear conversion, positive and negative signs of a diagonal element and an off-diagonal element of the matrix are reversed. Therefore, the influence of unnecessary color components leaked out to as oblique direction can be removed.

In reading a line drawing such as a name card, the skeleton processing is carried out, thereby mixing a high sensitive blue component. As a result, a sharply defined image can be obtained.

In the above-mentioned embodiments, scanner technique for reading out information of documents and pictures put on the display device has been described. Even in touch panel technique for picking-up and analyzing a state that a finger has touched on the surface of the display device to detect/calculate input coordinates and touch operation, by applying individual techniques, it is possible to improve accuracy of operation.

Even in pen input technique of contacting a pointing member (light pen) having a light source on display face, which picks up and analyzes a state that light from the light pen has been radiated, by applying individual techniques, it is possible to improve accuracy of operation.

For example, technique for removing influence of polarity inversion of the pixel described in FIG. 9 can improve quality of data included in picked-up image, thereby improving accuracy of positioning detection and so on. It is more advantageous to calculate coordinates by using image after removing display irregularity than to calculate coordinates by using image having irregularity.

What is claimed is:

1. A display device, comprising:
   a pixel array part having display elements provided inside of pixels formed in vicinity of cross points of signal lines and scanning lines aligned in matrix form;
   image capture circuits provided corresponding to said display elements, each including an optical sensor which picks up image at prescribed range of an imaging subject;
   an image capture processing unit which generates ultimate image capture data based on result of having picked up images a plurality of times while changing image capture condition except for display color, with respect to each of M kinds of display colors, and
   a color correction linear converter which performs matrix operation by using 3×3 matrix in which positive and negative signs of diagonal component and non-diagonal component are different from each other, with respect to a first color gradation signal, a second color gradation signal and a third color gradation signal outputted from said image capture circuit,
   wherein said image capture processing unit generates ultimate image capture data based on result of matrix operation by said color correction linear converter.

2. The display device according to claim 1, wherein said M kinds of display colors include red, green and blue.

3. The display device according to claim 1, wherein said M kinds of display colors include cyan, magenta and yellow.

4. A display device, comprising:
   a pixel array part having display elements provided inside of pixels formed in vicinity of cross points of signal lines and scanning lines aligned in matrix form;
   image capture circuits provided corresponding to said display elements, each including an optical sensor which picks up image at prescribed range of an imaging subject; and
   an image capture processing unit which generates ultimate image capture data based on result of having picked up images a plurality of times while changing image capture condition except for display color, with respect to each of M kinds of display colors,
   wherein display color at a first image capture time is a first color, display color at a second image capture time is a second color, and display color at a third image capture time is a third color;
   said first color, said second color and said third color are selected in the order of color having lower S/N ratio of said optical censor.

5. The display device according to claim 4, further comprising a gradation correction unit which performs gradation correction in accordance with gradation value of a specialized color with respect to a first color gradation signal, a second color gradation signal and a third color gradation signal outputted from said image capture circuit.

6. The display device according to claim 5, further comprising an irregularity subtraction unit which subtracts display irregularity of a first color gradation signal, a second color gradation signal and a third color gradation signal outputted from said image capture circuit,
wherein the gradation value of the specialized color is a gradation value of the specialized color after performing subtraction processing of display irregularity.

7. The display device according to claim 6, wherein said irregularity subtraction unit performs subtraction processing of display irregularity by calculating difference from uniform image picked up by said image capture circuit at state of setting the whole pixel array part to halftone.

8. The display device according to claim 5, wherein said specialized color is blue.

9. The display device according to claim 5, wherein said specialized color is a color having a highest S/N ratio of said optical sensor.

10. The display device according to claim 5, wherein gradation correction by said gradation correction unit is performed when the imaging subject is composed of line drawing data.

11. A display device, comprising:
an image array part which has display elements provided inside of pixels formed in vicinity of cross points of signal lines and scanning lines aligned in matrix form;
image capture circuits provided corresponding to said display elements, each picking up image at prescribed range of an image capture subject;
an image capture condition switching unit which switches in stages a exposure time in said image capture circuit; and
an irregularity processing unit which performs irregularity processing of a picked-up image, taking into consideration polarity of display data written into the pixel at image capture time.

12. The display device according to claim 11, wherein said irregularity processing unit has a unit of forming one piece of picked-up image by combining display data having a certain polarity of two picked-up images having polarities opposite to each other written into pixels at image capture time.

13. A display device, comprising:
a pixel array part having display elements provided inside of pixels formed in vicinity of cross points of signal lines and scanning lines aligned in matrix form;
image capture circuits provided corresponding to said display elements, each including an optical sensor which picks up image at prescribed range of an imaging subject;
an image capture condition switching unit which switches in stages exposure time in said image capture circuits,
wherein said image capture condition switch unit sets exposure time T in said image capture circuits so that $(1/T-1/T_0)^{1/\gamma}$ changes at substantially a constant interval, where T is an exposure time of said image capture circuits, T0 is an exposure time for reading out ideal black and $\gamma$ is a gamma value of said pixel array part.

14. The display device according to claim 13, further comprising an exposure time storage which stores in advance a plurality of exposure times which change a value $(1/T-1/T_0)^{1/\gamma}$ of at constant interval,
wherein said image capture condition switching unit selects the exposure times stored in said exposure time storage in order, to decide the exposure time of said image capture circuit.

15. The display device according to claim 13, wherein said T0 is time when a white color face material is arranged closely on display face side of said pixel array part, images are picked up repeatedly while changing the imaging time of said image capture circuit at state of turning off a backlight, and a ratio between white and black of image capture data outputted from said image capture circuit becomes 1:1.

16. The display device according to claim 13, wherein a minimum value of said T is time when a white color face material is arranged closely on display face side of said pixel array part, image are picked up repeatedly while changing the imaging time of said image capture circuit at state of turning on a backlight, and a ratio between white and black of image capture data outputted from said image capture circuit becomes 1:1.

17. The display device according to claim 13, further comprising a lid openable and closable which arranges the white color face closely to display face.

* * * * *